(12) United States Patent
Ho

(10) Patent No.: US 8,339,944 B2
(45) Date of Patent: Dec. 25, 2012

(54) SDU DISCARD MECHANISMS FOR WIRELESS COMMUNICATION SYSTEMS

(75) Inventor: Sai Yiu Duncan Ho, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1087 days.

(21) Appl. No.: 12/264,059

(22) Filed: Nov. 3, 2008

(65) Prior Publication Data

US 2009/0116426 A1    May 7, 2009

Related U.S. Application Data

(60) Provisional application No. 60/985,626, filed on Nov. 5, 2007.

(51) Int. Cl.
*H04L 12/26* (2006.01)

(52) U.S. Cl. ........................ 370/229; 370/465
(58) Field of Classification Search ........................ None
See application file for complete search history.

(56) References Cited

U.S. PATENT DOCUMENTS

| | | | |
|---|---|---|---|
| 6,219,339 B1 | 4/2001 | Doshi et al. | |
| 6,862,621 B2 | 3/2005 | Takada et al. | |
| 6,901,593 B2 | 5/2005 | Aweya et al. | |
| 7,149,187 B1 | 12/2006 | Jacobson et al. | |
| 7,633,880 B2 | 12/2009 | Bang et al. | |
| 2003/0206522 A1* | 11/2003 | Caia et al. | 370/230.1 |
| 2003/0210681 A1* | 11/2003 | Sumi et al. | 370/352 |
| 2004/0218617 A1* | 11/2004 | Sagfors | 370/412 |

FOREIGN PATENT DOCUMENTS

| | | |
|---|---|---|
| JP | 7273768 A | 10/1995 |
| JP | 11122264 A | 4/1999 |
| JP | 11177623 A | 7/1999 |
| JP | 2006238218 A | 9/2006 |

OTHER PUBLICATIONS

International Search Report & Written Opinion—PCT/US2008/082460, International Search Authority—European Patent Office—Mar. 17, 2009.

* cited by examiner

*Primary Examiner* — Kevin C Harper
(74) *Attorney, Agent, or Firm* — Charles Eggers; Kam T. Tam

(57) ABSTRACT

Systems and methodologies are described that facilitate packet discard restriction in a wireless communication system. As described herein, a discard prohibit counter and/or other similar mechanism can be employed to limit the number of consecutive packets that are discarded by a transmitter, even in the event that the delay bounds of those packets have been exceeded. A discard prohibit counter as described herein can be updated upon a packet transmission and reset upon a packet discard to ensure that an acceptable number of packets are transmitted before a packet can be discarded. An acceptable number of packets can be selected based on device specifications, requirements of a data packet flow and/or traffic associated with the flow, or other suitable factors, and can be constant or adaptable to changes in network conditions. As further described herein, multiple counters can be separately maintained and utilized for a plurality of corresponding packet flows.

27 Claims, 12 Drawing Sheets

FIG. 4

SDU DISCARD MECHANISMS FOR WIRELESS COMMUNICATION SYSTEMS

CROSS-REFERENCE

This application claims the benefit of U.S. Provisional Application Ser. No. 60/985,626, filed Nov. 5, 2007, and entitled "SDU DISCARD MECHANISMS FOR COMMUNICATION SYSTEMS," the entirety of which is incorporated herein by reference.

BACKGROUND

I. Field

The present disclosure relates generally to wireless communications, and more specifically to techniques for managing information designated for transmission over a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A wireless communication system can be configured with various quality of service (QoS) requirements to ensure the quality of signals communicated between devices in the system. For example, a communication system can associate a delay requirement with a data packet flow that can, for example, ensure that a packet is transmitted within a predetermined time after the packet is buffered for transmission.

Conventionally, in order to satisfy a QoS delay requirement for a data packet flow, a packet from the flow can be discarded at the transmitter when it cannot be delivered to the receiver within the associated delay requirement. However, because packets generally arrive at the transmitter in sequence from upper layers, when the delay bound of an oldest packet is reached due to transmitter congestion and/or other factors, the delay bounds of consecutive subsequent packets can similarly be reached at approximately the same time. This can result in the discarding of multiple consecutive packets, which can in turn result in a reduction in performance for some higher layer applications. Accordingly, it would be desirable to implement transmission management techniques that mitigate at least the above shortcomings.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for controlling packet discarding in a wireless communication system is described herein. The method can comprise identifying a packet to be transmitted for which a delay bound has been exceeded; determining whether at least a preconfigured number of packets have been transmitted between discarding a previous packet and identifying the packet to be transmitted; and prohibiting discarding of the packet to be transmitted upon determining that less than the preconfigured number of packets have been transmitted between discarding the previous packet and identifying the packet to be transmitted.

Another aspect relates to a wireless communications apparatus that can comprise a memory that stores data relating to a to-be-transmitted packet and a preconfigured number of packet transmissions. The memory can further comprise a processor configured to determine whether the preconfigured number of packet transmissions has occurred subsequent to discarding of a previous packet, and to prohibit discarding of the to-be-transmitted packet upon determining that the preconfigured number of packet transmissions has not occurred.

Yet another aspect relates to an apparatus that facilitates packet discard restriction in a wireless communication system. The apparatus can comprise means for discarding an initial delayed packet; and means for prohibiting discarding of a subsequent delayed packet if less than a predetermined number of packets following the initial delayed packet have been transmitted.

Still another aspect relates to a computer program product, which can comprise a computer-readable medium that comprises code for initializing a transmission counter; code for updating the transmission counter upon completing a transmission; code for resetting the transmission counter upon discarding data designated for transmission; and code for prohibiting discarding of data designated for transmission if the transmission counter does not indicate that at least a predetermined number of transmissions have occurred between a previous discard and identification of the data designated for transmission.

An additional aspect described herein relates to an integrated circuit that executes computer-executable instructions for managing a transmission buffer. The instructions can comprise buffering a data packet for transmission; determining a delay associated with the data packet; comparing the determined delay with a delay requirement for the packet; and if the determined delay exceeds the delay requirement for the packet, transmitting the packet upon determining that less than a predetermined number of packets have been transmitted subsequent to a previous discard or discarding the packet upon determining that at least the predetermined number of packets have been transmitted subsequent to a previous discard.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

BRIEF DESCRIPTION OF THE DRAWINGS

FIGS. 3-4 illustrate operation of respective example discard prohibit counters as implemented for an example transmit buffer in accordance with various aspects.

DETAILED DESCRIPTION

Figure 1:
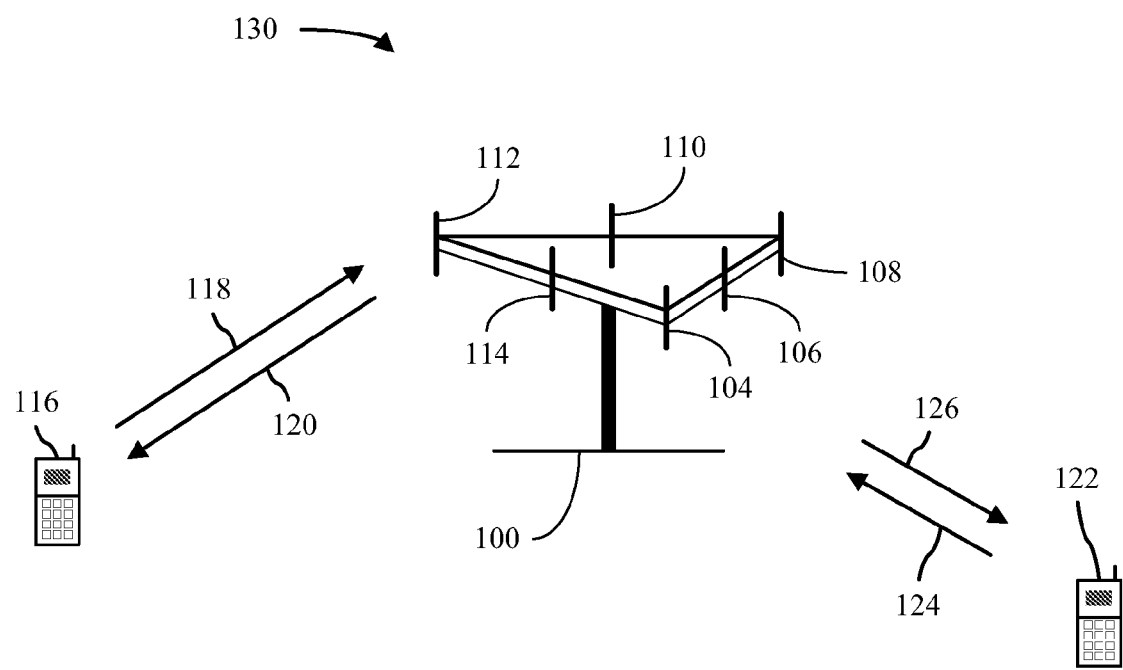
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards.

A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system 130 in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g., an access terminal 116 or 122, can also be referred to as a mobile terminal, user equipment (UE), a wireless communication device, a terminal, a wireless terminal, and/or other appropriate terminology.

Figure 2:
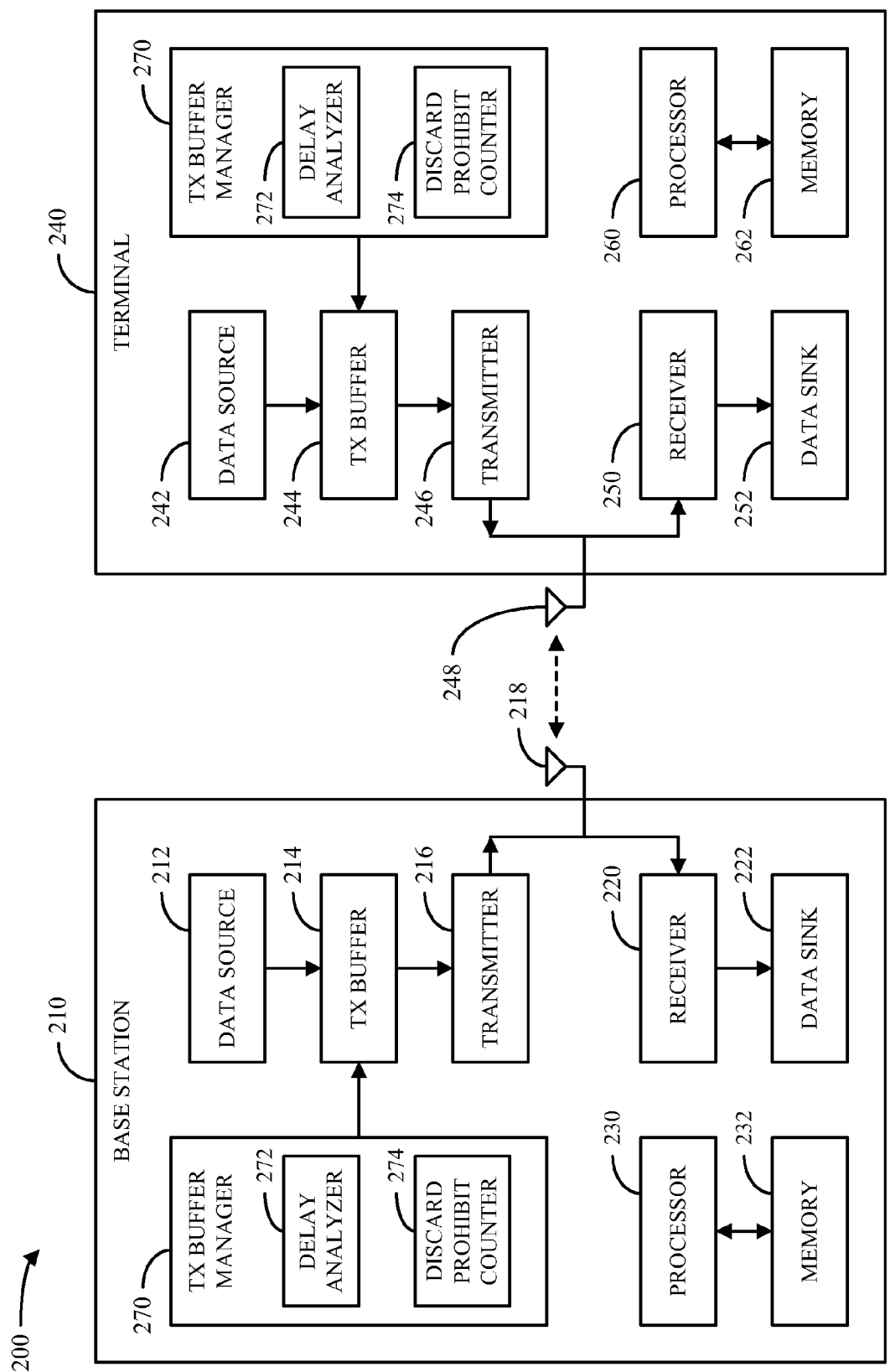
FIG. 2 is a block diagram of a system for buffering and communicating information over a wireless communication system in accordance with various aspects.

FIG. 2 is a block diagram of a system 200 for buffering and communicating information over a wireless communication system in accordance with various aspects provided herein. In one example, system 200 can include one or more base stations 210 and one or more terminals 240, which can communicate with each other via respective antennas 218 and 248. While only one base station 210 and terminal 240 are illustrated in system 200, it can be appreciated that system 200 can include any number of base stations 210 and/or terminals 240, each of which can utilize any suitable number of antennas 218 and/or 248.

In accordance with one aspect, base station 210 can communicate data, control signaling, and/or other information in the following manner. Initially, a data source 212 at base station 210 can generate and/or otherwise provide information to be communicated to one or more terminals 240. In one example, data source 212 can be associated with one or more upper layer applications to provide application data, with a network controller to provide power control and/or scheduling information, and or with any other suitable entity to provide any other information for communication to a terminal 240. In one example, information can be provided by data source 212 as a series of packets, such as Packet Data Convergence Protocol (PDCP) Service Data Units (SDUs) or the like.

Information provided by data source 212 can subsequently be received by a transmit (Tx) buffer 214, where it is stored pending transmission by a transmitter 216. In one example, information transmitted by transmitter 216 can be conveyed as a signal via an antenna 218 to terminal 240, where the signal can be received by a receiver 250 via an antenna 248. Received data at terminal 240 can then be provided to a data sink 252, which can be associated with upper level applications at the terminal 240, a device controller for the terminal 240, or the like.

Additionally and/or alternatively, terminal 240 can communicate information to base station 210 in a similar manner to that described above using a data source 242, a Tx buffer 244, a transmitter 246, and antenna 248. Information transmitted by terminal 240 can then be received by base station 210 via antenna 218, receiver 220, and data sink 222 in a similar manner to that described above with respect to antenna 248, receiver 250, and data sink 252 at terminal 240. In one example, base station 210 can additionally utilize a processor 230 and/or memory 232 to act as and/or implement the functionality of one or more of the component parts of the base station described above. As system 200 further illustrates, terminal 240 can utilize a processor 260 and/or memory 262 in a similar manner.

In some existing communication systems, to satisfy QoS delay requirements for a data packet flow, a SDU and/or other suitable type of packet from a flow can be discarded at the transmitter side (e.g., by base station 210 prior to transmission to terminal 240 or vice versa) when the packet cannot be delivered to the intended receiver within the delay requirement or delay bound of the packet. By discarding a packet in this manner, the transmitting entity can save the over-the-air bandwidth that would be used for transmitting the to-be-discarded packet and can additionally limit the number of packets that are required to be stored in a Tx buffer 214 and/or 244 at a given time.

However, because packets are received and buffered in sequence from upper layers, it can be observed that when a transmitter 216 and/or 246 is congested and the packet delay bound of the oldest packet is about to be reached, the delay bounds of consecutive subsequent packets can similarly be reached at approximately the same time. This can result in multiple consecutive packets being discarded, which in turn can create problems with some higher level applications. For example, a TCP/IP (Transmission Control Protocol/Internet Protocol) application can shut down the TCP transmitting window and reduce throughput in response to discarded packets. In addition, in a Voice over Internet Protocol (VoIP) application with robust header compression (RoHC), discarded packets can cause an associated decompressor to become desynchronized such that resynchronization is required.

In accordance with one aspect, base stations 210 and/or terminals 240 in system 200 can incorporate a Tx buffer manager 270, which can manage packet transmission, packet discarding, and/or any other appropriate operations with respect to an associated Tx buffer 214 and/or 244 to mitigate the above noted shortcomings of traditional systems and/or to provide other benefits as described herein. In one example, Tx buffer manager 270 can include a delay manager 272 that can analyze one or more buffered packets in relation to delay requirements or bounds associated therewith. In addition, Tx buffer manager 270 can include one or more discard prohibit counters 274, which can operate to limit the number of consecutive SDUs and/or other packets that are discarded, even in the event that the delay bounds of those packets have been exceeded. In one example, a discard prohibit counter 274 can work in conjunction with a delay analyzer 272 to improve efficiency and performance of an associated device 210 and/or 240.

In accordance with another aspect, discard prohibit counter 274 can be initialized to a preconfigured value such that a number of packets equal to the preconfigured value must be transmitted before a packet is permitted to be discarded, irrespective of any delay requirements associated with the packets. The preconfigured value can be chosen by any suitable entity, which can be associated with and/or external to a device associated with Tx buffer manager 270. For example, the preconfigured value can be chosen by a processor 230 and/or 260 or the like. In one example, the preconfigured value can be selected based on device specifications and/or requirements of a data packet flow and/or traffic associated with the flow. For example, traffic on a data packet flow having a high degree of tolerance for discarded packets can be configured to require only a small number of transmitted packets between discards, while traffic on a flow with a lower tolerance for discarded packets can be configured to require a larger number. In addition, the preconfigured value can be a constant value or configured to change over time based on varying traffic requirements or the like.

In one example, discard prohibit counter 274 can be implemented as a count-down counter such that the counter 274 is initialized to a preconfigured value (e.g., by RRC) whenever a packet is discarded. Additionally and/or alternatively, the counter 274 can be decremented for each subsequent packet that is transmitted. Based on these operations, when the value of the counter 274 is greater than 0, an associated transmitter 216 and/or 246 can be prohibited from discarding any packets, even when the delay bounds of those packets have been exceeded. Conversely, when the counter 274 reaches 0, the associated transmitter 216 and/or 246 can then again be allowed to discard one or more packets based on their delay bounds. Examples of manners in which counter 274 can operate are illustrated and described in further detail infra.

It can be appreciated that by configuring the initial value of the counter 274, the number of consecutive packets that can be discarded due to excessive delay can be limited. By configuring the initial value of the counter 274 to 0 in the above example, it can be appreciated that the counter 274 can effectively be disabled to allow an associated transmitter 216 and/or 246 to discard any packet that exceeds the delay bound.

In accordance with one aspect, a discard prohibit counter 274 can alternatively be configured as a count-up counter. For example, the counter 274 can be configured such that it is reset to an initial value (e.g., 0) when a packet is discarded and incremented for each transmitted packet. When a packet is identified that exceeds its corresponding delay bound, the counter 274 can then be compared against a preconfigured ending value to determine whether a sufficient number of packets have been transmitted to allow the packet to be discarded.

Figure 3:
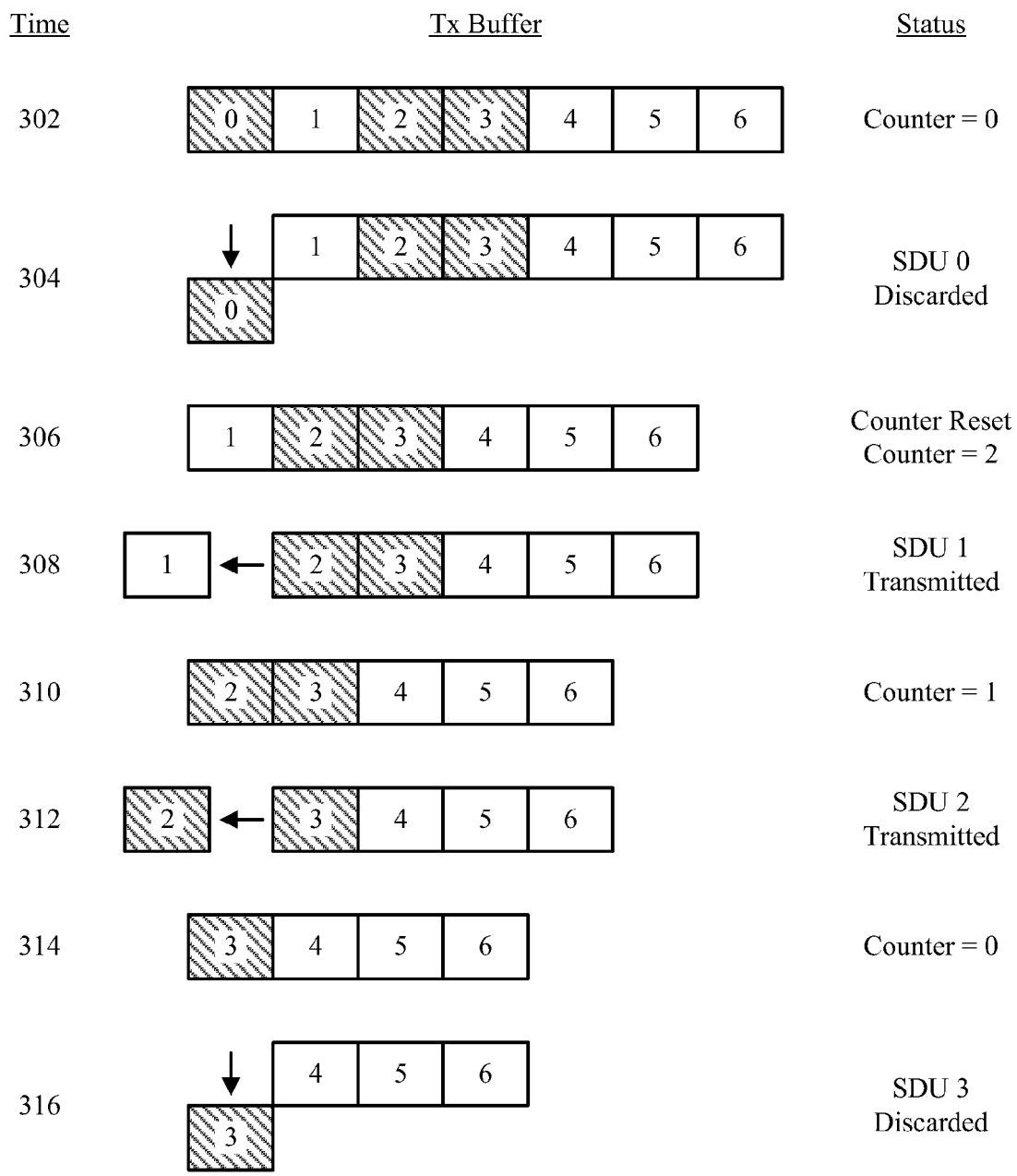

Turning now to FIG. 3, a diagram 300 is provided that illustrates the operation of an example discard prohibit counter in accordance with various aspects. Diagram 300 begins at time 302, at which time a transmit buffer contains seven SDUs, labeled in diagram 300 as 0-6. While SDUs are illustrated in diagram 300, it should be appreciated that any other suitable type of packet could alternatively be utilized. As diagram 300 further illustrates, delay bounds for SDUs 0, 2, and 3 have been exceeded. It can be observed that at time 302, a discard prohibit counter ("Counter") associated with the transmit buffer is equal to 0. Accordingly, at time 304, discarding of leading SDU 0, which has exceeded its delay bound, is permitted. Following discarding of SDU 0 at time 304, the counter is reset to a preconfigured value at time 306. For the purposes of illustration in diagram 300 the counter is reset to a value of 2 at time 306; however, it should be appreciated that the counter could be reset to any suitable preconfigured value.

Following the discarding of SDU 0 at time 304, the transmit buffer contains SDUs 1-6 at time 306. Upon determining that SDU 1 has not exceeded its delay bound, SDU 1 can be transmitted at time 308. Subsequent to transmission of SDU 1 at time 308, the prohibit counter can be decremented to 1 at time 310.

As illustrated at time 310, SDUs 2-6 remain in the transmit buffer. At time 312, leading SDU 2 can be analyzed against its delay bound, at which time it can be determined that SDU 2 has exceeded its delay bound. However, as the prohibit counter is greater than 0 at time 312, discarding of a delayed SDU can be prohibited. Accordingly, in one example, SDU 2 can be transmitted at time 312 despite the delay bound of said SDU.

Following transmission of SDU 2 at time 312, the prohibit counter can again be decremented at time 314 to a value of 0. Further, as illustrated by diagram 300, SDUs 3-6 remain in the transmit buffer at time 314. Accordingly, SDU 3 can be analyzed at time 316 with respect to its delay bound. As can be observed from diagram 300, this analysis can result in a determination that SDU 3 has exceeded its delay bound. Accordingly, in a similar manner to time 312, the prohibit counter for the transmit buffer can be checked to determine whether SDU 3 can be discarded. As the prohibit counter at time 316 equals 0, discarding of SDU 3 can be permitted to occur. Following discarding of SDU 3 at time 316, the counter would again reset to the predetermined initialization value (e.g., 2) and operation would continue on the transmit buffer for SDUs 4-6.

Figure 4:
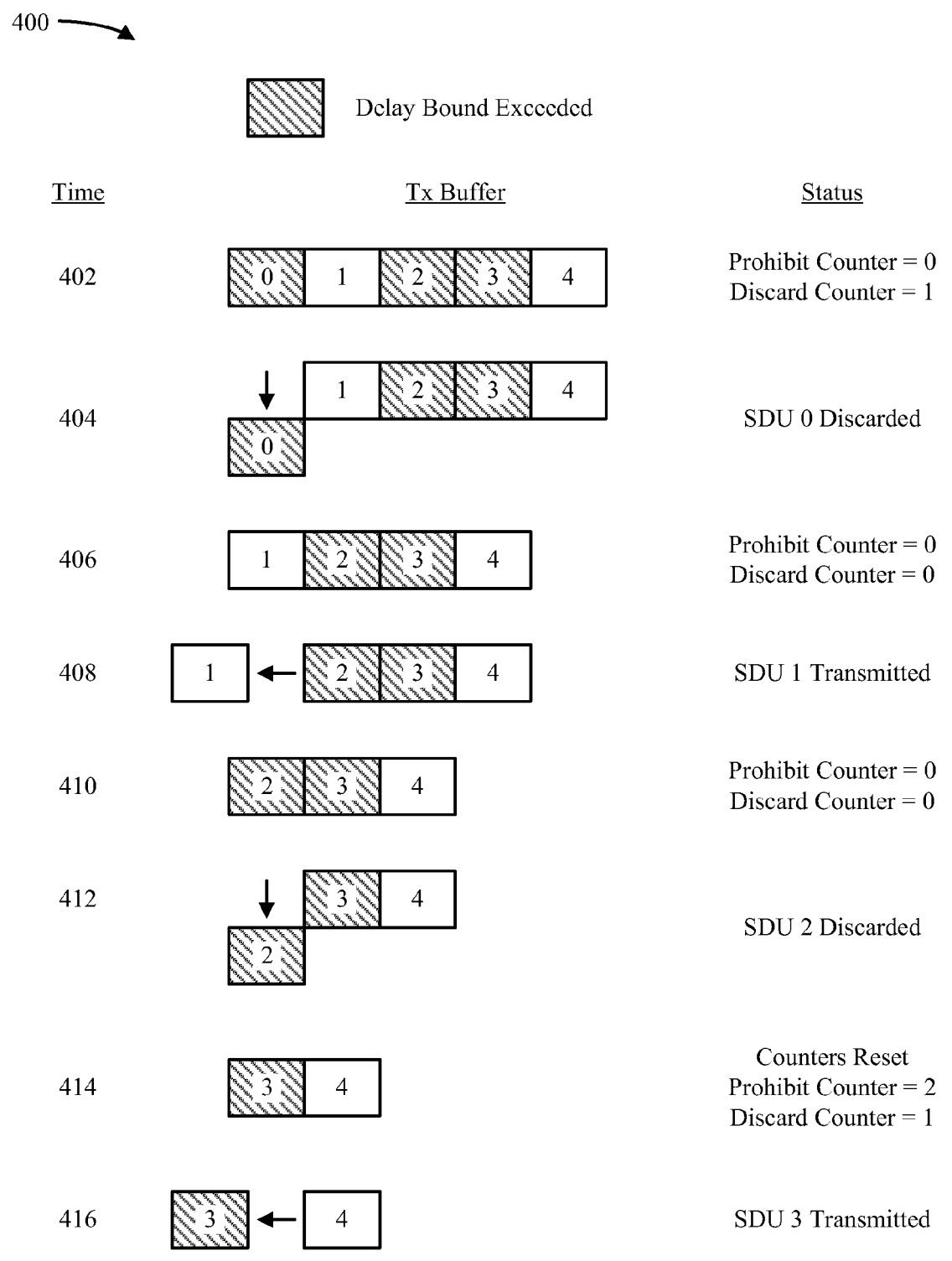

FIG. 4 is a diagram 400 that illustrates the operation of an alternate prohibit counter implementation in accordance with various aspects. In accordance with one aspect, diagram 400 illustrates the use of a discard prohibit counter ("Prohibit Counter") that functions in a similar manner to the prohibit counter illustrated by diagram 300 to prohibit discarding of SDUs (or any other suitable type of packet) until a preconfigured number of SDUs have been transmitted. In addition, diagram 400 also utilizes a SDU discard counter ("Discard Counter"), which can allow multiple SDUs to be discarded between activations of the prohibit counter, thereby allowing an additional degree of control for SDU discarding.

Diagram 400 begins at time 402, at which time a transmit buffer contains five SDUs, labeled in diagram 400 as 0-4. As diagram 400 further illustrates, delay bounds for SDUs 0, 2, and 3 have been exceeded. It can be observed that at time 402, the discard prohibit counter associated with the transmit buffer is equal to 0, and the SDU discard counter is equal to 1. Next, at time 404, it can be determined that SDU 0 has exceeded its delay bound. Because the discard prohibit counter is equal to 0 at time 404, SDU 0 can be discarded at that time in a similar manner to the discard illustrated at time 304 in diagram 300.

In accordance with one aspect, the SDU discard counter can then be checked at time 406 to determine whether more SDUs can be discarded before resetting the discard prohibit counter. In one example, this check can be performed by determining whether the SDU discard counter is nonzero. As the SDU discard counter is equal to 1 at time 406, the SDU discard counter can be decremented. In addition, it should be appreciated that, in contrast to diagram 300, the discard prohibit counter is left unchanged at time 406 following discarding of SDU 0 at time 404.

As illustrated at time 406, SDUs 1-4 remain in the transmit buffer. As diagram 400 further illustrates, leading SDU 1 has not exceeded its delay bound at time 406. Therefore, SDU 1 can be transmitted at block 408. Following transmission of SDU 1 at time 408, the discard prohibit counter can be decremented at time 410. However, as it can be observed that the discard prohibit counter already equals 0 at time 408, the counter can be configured to remain at 0.

It can be observed that, at time 410, delayed SDU 2 leads the transmit buffer. Accordingly, because the discard prohibit counter equals 0 at time 410, SDU 2 can be discarded at time 412. Next, at time 414, the SDU discard counter can again be checked to determine whether additional SDUs can be discarded before requiring a counter reset. As the SDU discard counter equals 0 at time 414, it can be determined that no more SDUs can be discarded and that a counter reset is required. Accordingly, the discard prohibit counter and SDU discard counter can be reset to respective preconfigured values at time 414. While diagram 400 illustrates that the discard prohibit counter is reset to a value of 2 and the SDU discard counter is reset to a value of 1, it should be appreciated that any suitable values could be used.

Subsequently, at time 416, delayed SDU 3 leads the transmit buffer. However, as the discard prohibit counter was reset at time 414, discarding of SDU 3 can be prohibited at time 416. Accordingly, as diagram 400 illustrates, SDU 3 can be transmitted at time 416 despite its associated delay. After transmitting SDU 3 at time 416, the discard prohibit counter could be decremented and processing similar to that illustrated by diagram 400 could continue for packet 4 and/or any subsequently buffered packets.

In accordance with one aspect, multiple counters can be utilized as illustrated by diagram 400 to allow discarding of multiple packets prior to a counter reset. Alternatively, a SDU discard counter as illustrated by diagram 400 can operate to control discarding of packets in different ways. For example, the SDU discard counter can be configured to allow only discarding of consecutive delayed packets and to reset upon transmission of a packet. As another example, the SDU discard counter can be configured to allow discarding of multiple packets prior to a counter reset but nonetheless disallow discarding of consecutive packets. It should be appreciated that these modes of operation are provided as non-limiting examples and that any suitable mode of operation could be utilized.

Figure 5:
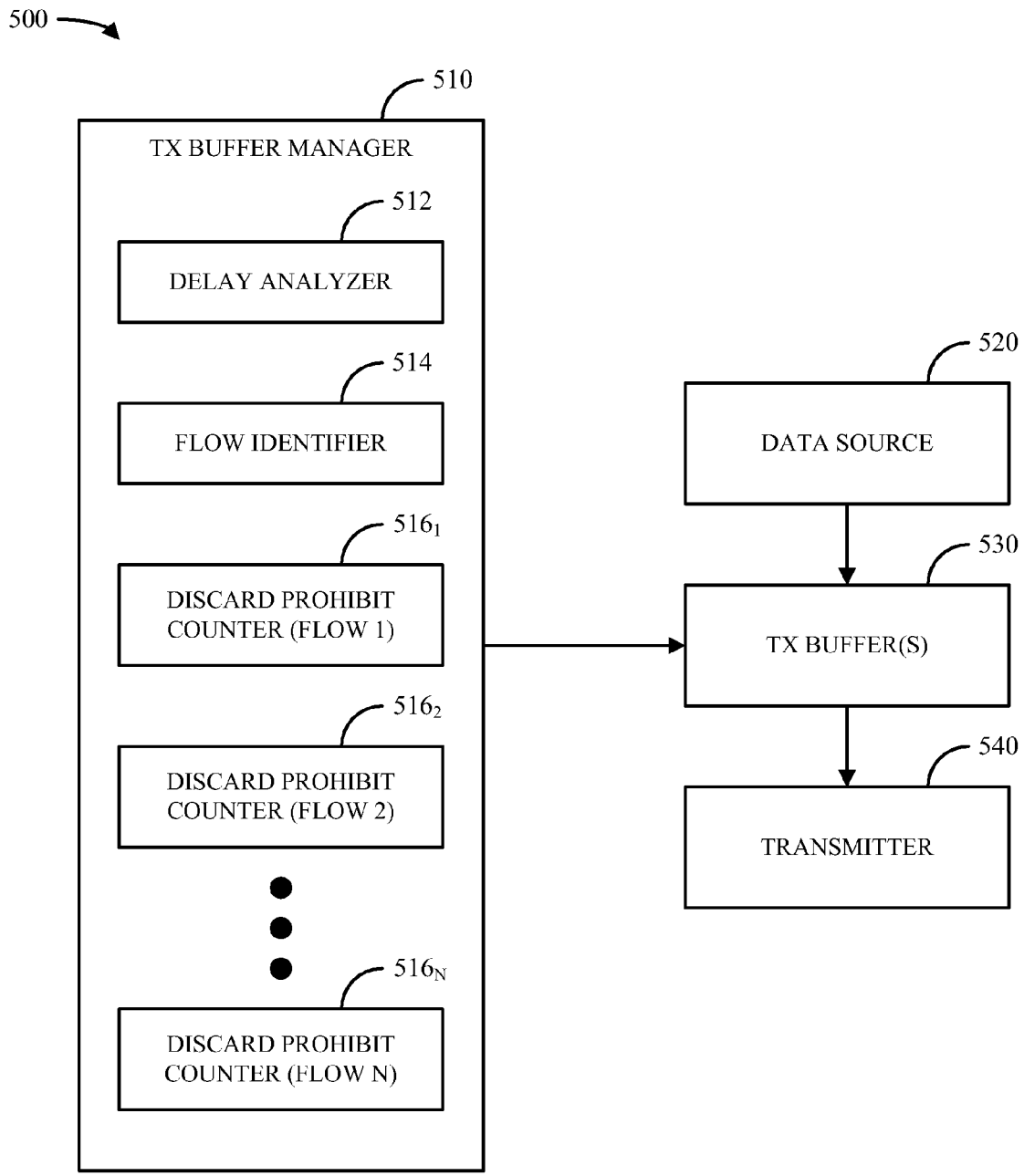
FIG. 5 is a block diagram of a system for managing transmission of respective packets over multiple packet flows in accordance with various aspects.

Referring now to FIG. 5, a block diagram of a system 500 for managing transmission of respective packets over multiple packet flows in accordance with various aspects is illustrated. In one example, system 500 can facilitate a transmission of information that originates from a data source 520, is buffered at one or more transmit buffers 530, and is transmitted via a transmitter 540 in a similar manner to that described above with respect to base station 210 and/or terminal 240 in system 200.

In accordance with one aspect, system 500 can additionally include a transmit buffer manager 510, which can manage packets stored by the transmit buffer(s) 530 to improve data transmission efficiency and performance. In one example, transmit buffer manager 510 can restrict discarding of packets buffered at transmit buffer(s) 530 that are determined to have exceeded their corresponding delay bound. As diagram 500 illustrates, a delay analyzer 512 at transmit buffer manager 510 can be utilized to determine whether a packet has exceeded its delay bound.

In accordance with another aspect, system 500 can facilitate transmission of packets on multiple data packet flows, which can correspond to applications utilized by system 500, traffic types utilized by system 500, and/or any other suitable designation. Accordingly, transmit buffer(s) 530 can facilitate buffering of data corresponding to multiple applications and/or flows. In one example, a single transmit buffer 530 can be utilized for all flows. Alternatively, multiple transmit buffers 530 can be utilized that respectively correspond to one or more individual flows.

In one example, transmit buffer manager 510 can be configured to provide independent packet discard prohibition functionality for each flow utilized by system 500. To this end, transmit buffer manager 510 can include a flow identifier 514, which can identify a flow associated with a packet in a transmit buffer 530. Additionally and/or alternatively, transmit buffer manager 510 can maintain a plurality of discard prohibit counters 516 that correspond to respective flows utilized by system 500. In one example, based on an identified flow for a packet, transmit buffer manager 510 can facilitate processing of the packet using a counter 516 that corresponds to the identified flow for the packet. In accordance with one aspect, counters 516 can be separately maintained and/or configured. For example, the counters 516 can have different initialization values depending on the traffic requirements of their associated flows.

Figure 6:
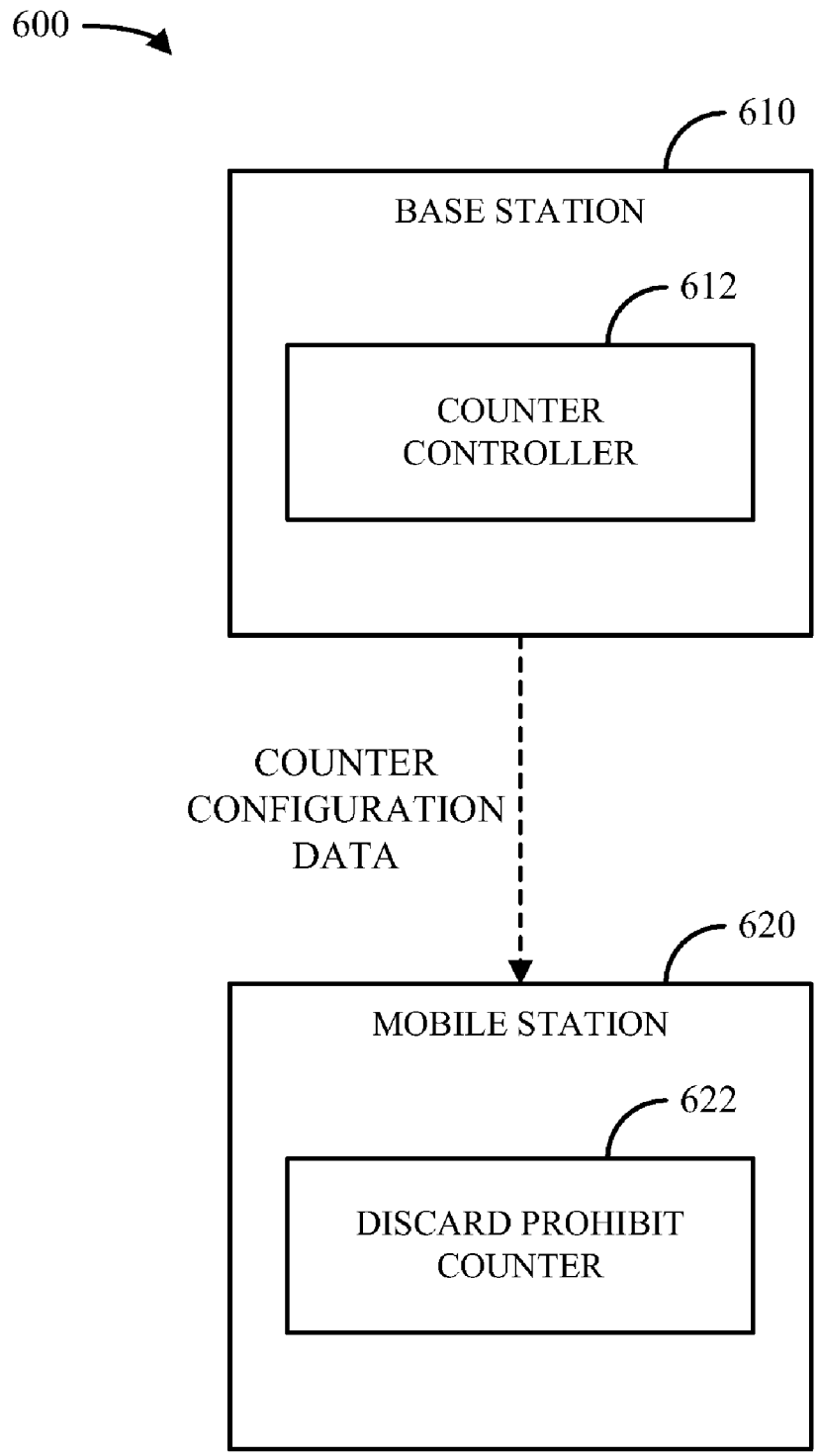
FIG. 6 is a block diagram of a system for controlling and configuring a discard prohibit counter in accordance with various aspects.

FIG. 6 is a block diagram that illustrates a system 600 for controlling and configuring a discard prohibit counter in accordance with various aspects. As FIG. 6 illustrates, system 600 includes a base station 610 and a mobile station 620. In one example, mobile station 620 can include a discard prohibit counter 622, which can operate in accordance with various aspects described herein to facilitate management and processing of information to be communicated to base station 610 and/or any other suitable entity in system 600. In accordance with one aspect, base station 610 can include a counter controller 612, which can generate counter configuration data for use by mobile station 620. These data can subsequently be communicated to mobile station 620 to facilitate configuration of its associated discard prohibit counter 622. Counter configuration data can include, for example, counter initialization values, operating instructions, and/or any other suitable information.

In one example, counter controller 612 can be utilized to configure a discard prohibit counter 622 at a mobile device 620 that lacks sufficient processing power or other resources to configure a discard prohibit counter 622 locally. Alternatively, counter controller 612 can supply configuration data to multiple mobile terminals 620 served by an associated base station 610 to facilitate uniform operation among the mobile stations 620. As another alternative, a mobile station 620 can configure some or all aspects of an associated discard prohibit counter 622 locally and utilize data obtained from base station 610 in addition to and/or in place of locally generated configuration data.

Figure 7:
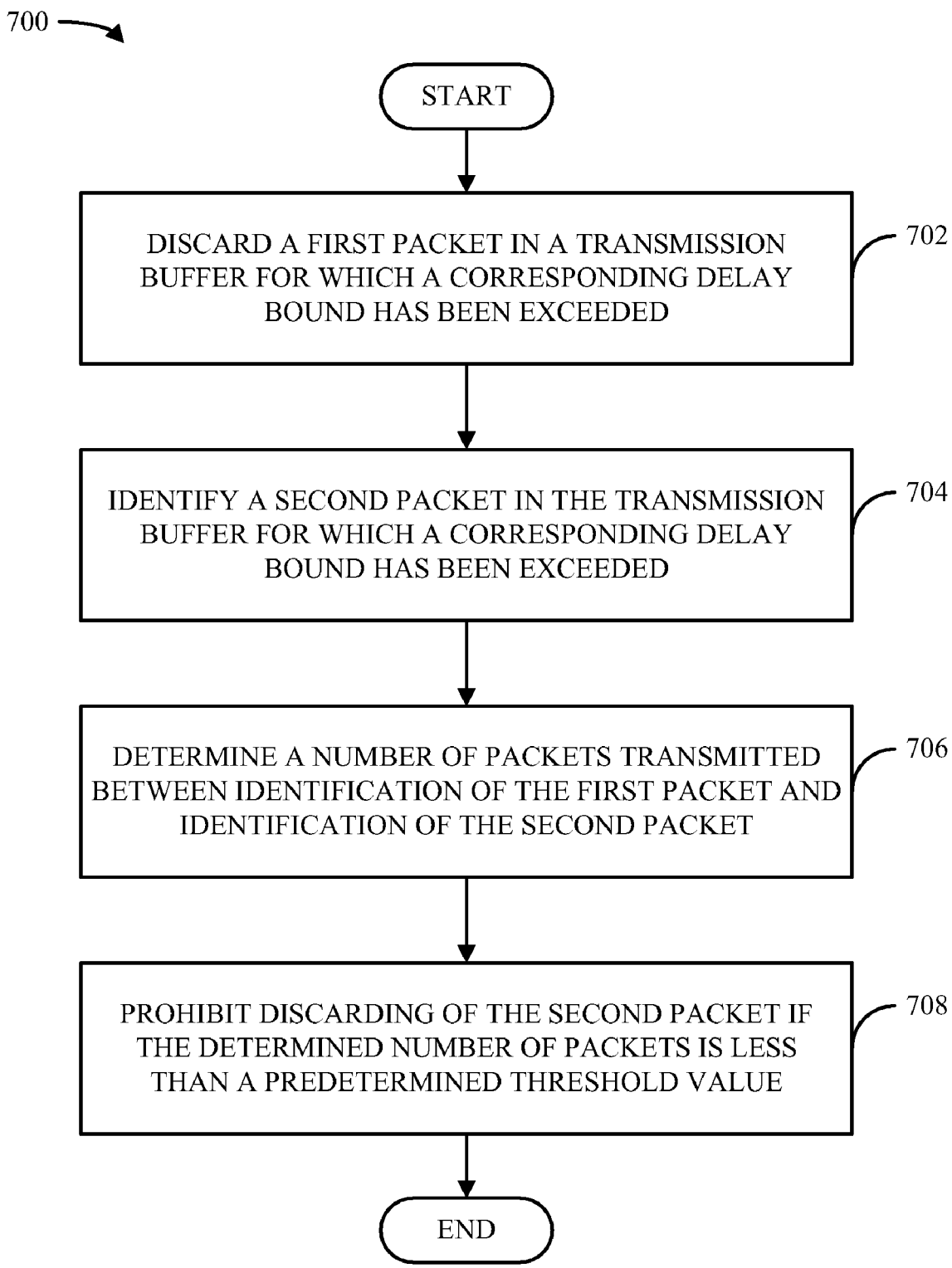
FIG. 7 is a flow diagram of a method for restricting packet discarding in a wireless communication system.
Figure 8:
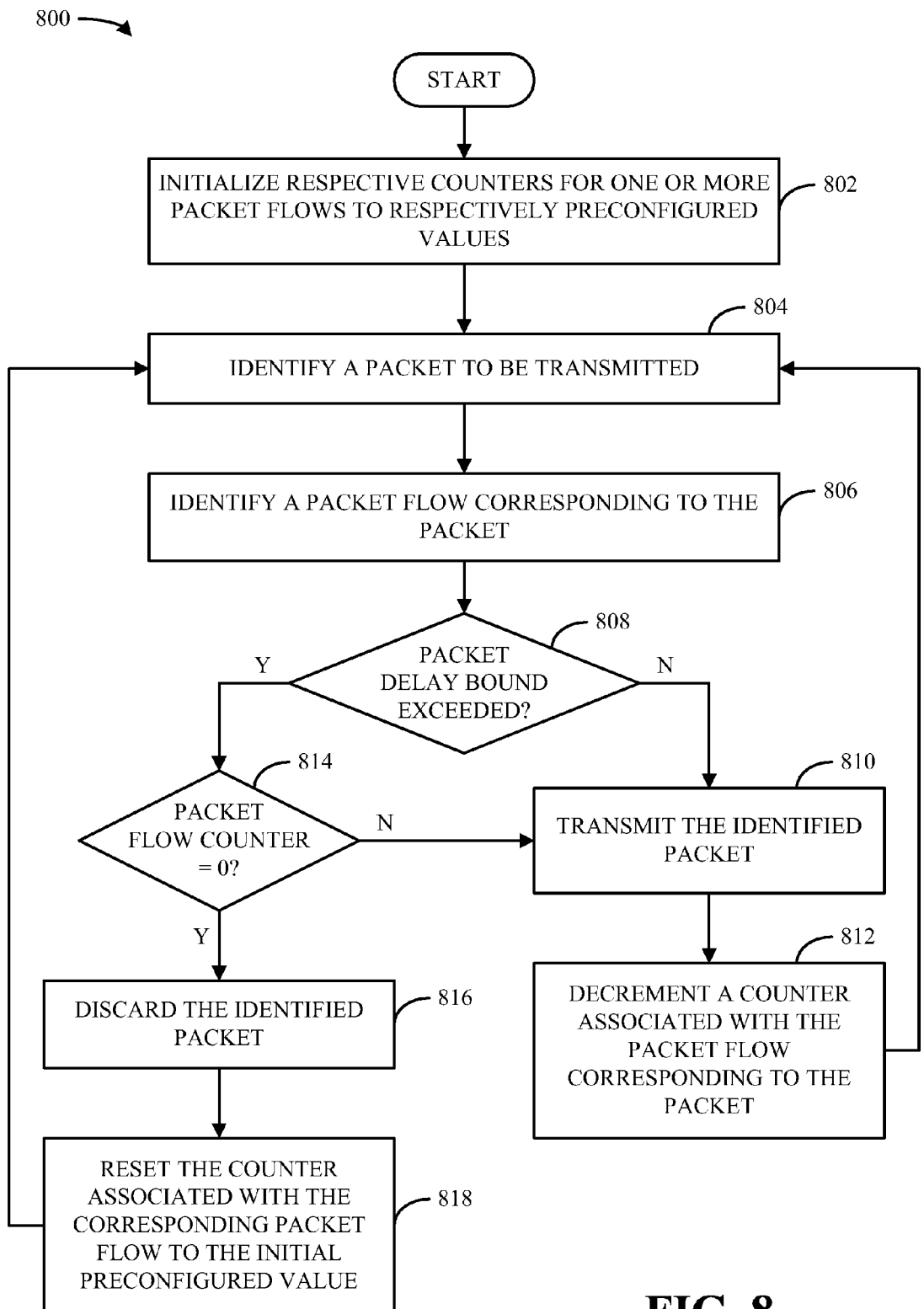
FIG. 8 is a flow diagram of a method for managing packet transmissions based on respective packet flow counters.

Referring to FIGS. 7-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for restricting packet discarding in a wireless communication system in a wireless communication system (e.g., system 200). It is to be appreciated that methodology 700 can be performed by, for example, a base station (e.g., base station 210), a mobile station (e.g., terminal 220), and/or any other appropriate network entity. Methodology 700 begins at block 702, wherein a first packet in a transmission buffer (e.g., Tx buffer 214 and/or 244) for which a corresponding delay bound has been exceeded is discarded. Next, at block 704, a second packet in the transmission buffer for which a corresponding delay bound has been exceeded is identified.

Upon completing the acts described at block 704, methodology 700 can then proceed to block 706, wherein a number of packets that have been transmitted between identification of the first packet at block 702 and identification of the second packet at block 704 is determined. In one example, the determination at block 706 can be accomplished using one or more count-up and/or count-down counters (e.g., one or more discard prohibit counters 274). Methodology 700 can then conclude at block 708, wherein discarding of the second packet identified at block 704 is prohibited if the number of packets determined at block 706 is less than a predetermined threshold value. In an example wherein a determination at block 706 is accomplished via a counter, prohibition of discarding at block 708 can be made conditional on a comparison between the current state of the counter and a desired ending value for the counter. For example, the desired ending value can be a predetermined final value for a count-up counter or 0 for a count-down counter.

FIG. 8 illustrates a methodology 800 for managing packet transmissions based on respective packet flow counters (e.g., discard prohibit counters 516). Methodology 800 can be performed by, for example, a Node B (e.g., base station 210), a UE (e.g., terminal 220), and/or any other appropriate network entity. Methodology 800 begins at block 802, wherein respective counters for one or more packet flows are initialized to respectively preconfigured values. Next, at block 804, a packet to be transmitted (e.g., a packet buffered at a transmit buffer 530) is identified. A packet flow corresponding to the packet identified at block 804 is then identified at block 806 (e.g., by a flow identifier 514).

Methodology 800 can then proceed to block 808, wherein it is determined (e.g., by a delay analyzer 512) whether the delay bound of the packet identified at block 804 has been exceeded. If the delay bound of the packet is determined not to have been exceeded, methodology 800 proceeds to block 810, wherein the packet is transmitted (e.g., by a transmitter 540). Methodology 800 can then continue to block 812, wherein a counter associated with the packet flow identified at block 806 is decremented, after which methodology 800 can return to block 804 to process a subsequent packet.

If, in contrast, it is determined at block 808 that the delay bound of the packet identified at block 804 has been exceeded, methodology 800 can instead proceed to block 814, wherein it is determined whether a counter associated with the packet flow identified at block 806 is equal to 0. If the counter is nonzero, methodology 800 continues to block 810 and operation proceeds as described above. Otherwise, methodology 800 continues to block 816, wherein the packet identified at block 804 is discarded. Methodology 800 can then proceed to block 818, wherein the counter associated with the flow identified at block 806 is reset, after which methodology 800 can return to block 804 to process a subsequent packet.

In accordance with one aspect, methodology 800 can proceed as described above and as illustrated in FIG. 8 using one or more count-down counters associated with respective packet flows. However, it should be appreciated that methodology 800 could be modified to utilize one or more count-up counters by, for example, setting the preconfigured counter starting value utilized in blocks 802 and 818 to 0, determining whether a counter value equals a preconfigured ending value instead of 0 at block 814, and incrementing the counter instead of decrementing at block 812. Alternatively, any other suitable configuration of counters, such as a combination of count-up and count-down counters, an arrangement of multiple counters per flow (e.g., as illustrated by diagram 400), or the like, could be utilized.

Figure 9:
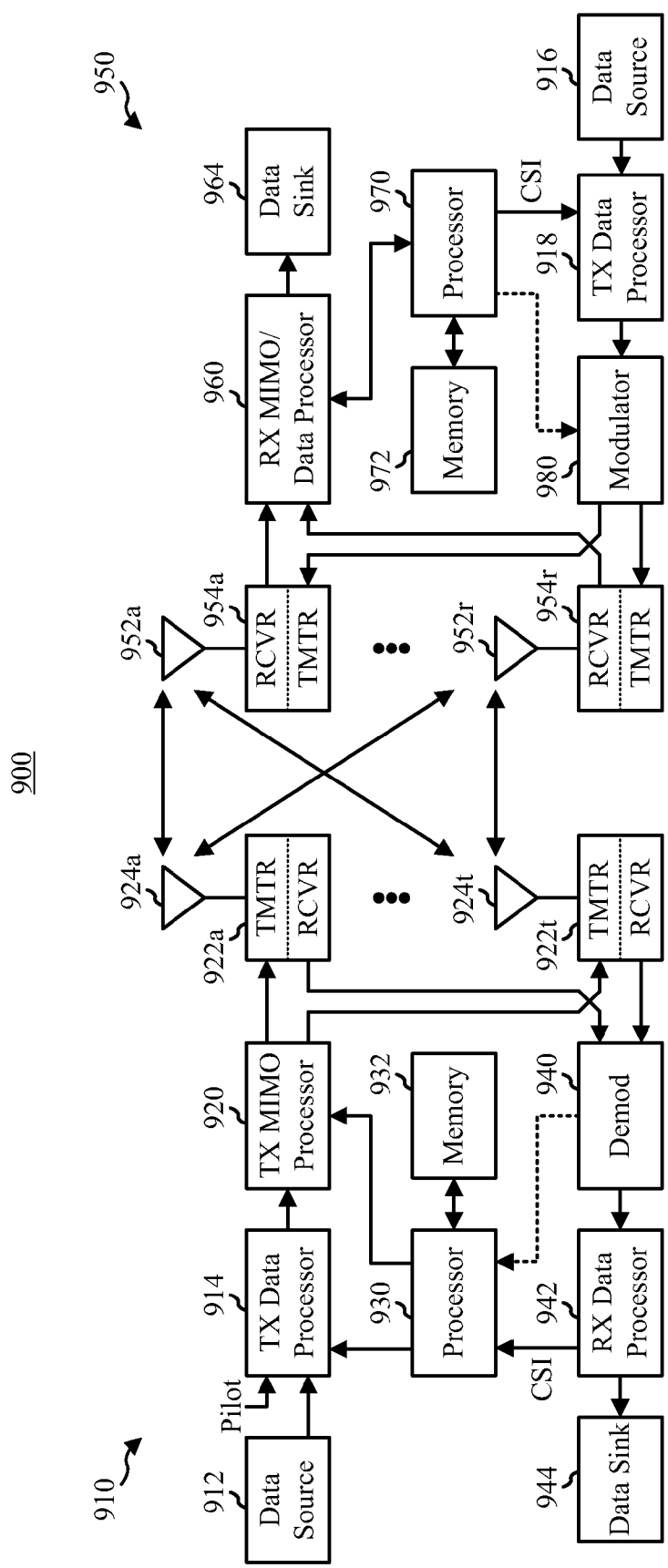
FIG. 9 is a block diagram illustrating an example wireless communication system in which various aspects described herein can function.

Referring now to FIG. 9, a block diagram illustrating an example wireless communication system 900 in which various aspects described herein can function is provided. In one example, system 900 is a multiple-input multiple-output (MIMO) system that includes a transmitter system 910 and a receiver system 950. It should be appreciated, however, that transmitter system 910 and/or receiver system 950 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 910 and/or receiver system 950 described herein could be utilized in connection with a single output to single input antenna system.

In accordance with one aspect, traffic data for a number of data streams are provided at transmitter system 910 from a data source 912 to a transmit (TX) data processor 914. In one example, each data stream can then be transmitted via a respective transmit antenna 924. Additionally, TX data processor 914 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 950 to estimate channel response. Back at transmitter system 910, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 930.

Next, modulation symbols for all data streams can be provided to a TX processor 920, which can further process the modulation symbols (e.g., for OFDM). TX MIMO processor 920 can then provides $N_T$ modulation symbol streams to $N_T$ transceivers 922a through 922t. In one example, each transceiver 922 can receive and process a respective symbol stream to provide one or more analog signals. Each transceiver 922 can then further condition (e.g., amplify, filter, and upconvert) the analog signals to provide a modulated signal suitable for transmission over a MIMO channel. Accordingly, $N_T$ modulated signals from transceivers 922a through 922t can then be transmitted from $N_T$ antennas 924a through 924t, respectively.

In accordance with another aspect, the transmitted modulated signals can be received at receiver system 950 by $N_R$ antennas 952a through 952r. The received signal from each antenna 952 can then be provided to respective transceivers 954. In one example, each transceiver 954 can condition (e.g., filter, amplify, and downconvert) a respective received signal, digitize the conditioned signal to provide samples, and then processes the samples to provide a corresponding "received" symbol stream. An RX MIMO/data processor 960 can then receive and process the $N_R$ received symbol streams from $N_R$ transceivers 954 based on a particular receiver processing technique to provide $N_T$ "detected" symbol streams. In one example, each detected symbol stream can include symbols that are estimates of the modulation symbols transmitted for the corresponding data stream. RX processor 960 can then process each symbol stream at least in part by demodulating, deinterleaving, and decoding each detected symbol stream to recover traffic data for a corresponding data stream. Thus, the processing by RX processor 960 can be complementary to that performed by TX MIMO processor 920 and TX data processor 914 at transmitter system 910. RX processor 960 can additionally provide processed symbol streams to a data sink 964.

In accordance with one aspect, the channel response estimate generated by RX processor 960 can be used to perform space/time processing at the receiver, adjust power levels, change modulation rates or schemes, and/or other appropriate actions. Additionally, RX processor 960 can further estimate channel characteristics such as, for example, signal-to-noise-and-interference ratios (SNRs) of the detected symbol streams. RX processor 960 can then provide estimated channel characteristics to a processor 970. In one example, RX processor 960 and/or processor 970 can further derive an estimate of the "operating" SNR for the system. Processor 970 can then provide channel state information (CSI), which can comprise information regarding the communication link and/or the received data stream. This information can include, for example, the operating SNR. The CSI can then be processed by a TX data processor 918, modulated by a modulator 980, conditioned by transceivers 954a through 954r, and transmitted back to transmitter system 910. In addition, a data source 916 at receiver system 950 can provide additional data to be processed by TX data processor 918.

Back at transmitter system 910, the modulated signals from receiver system 950 can then be received by antennas 924, conditioned by transceivers 922, demodulated by a demodulator 940, and processed by a RX data processor 942 to recover the CSI reported by receiver system 950. In one example, the reported CSI can then be provided to processor 930 and used to determine data rates as well as coding and modulation schemes to be used for one or more data streams. The determined coding and modulation schemes can then be provided to transceivers 922 for quantization and/or use in later transmissions to receiver system 950. Additionally and/or alternatively, the reported CSI can be used by processor 930 to generate various controls for TX data processor 914 and TX MIMO processor 920. In another example, CSI and/or other information processed by RX data processor 942 can be provided to a data sink 944.

In one example, processor 930 at transmitter system 910 and processor 970 at receiver system 950 direct operation at their respective systems. Additionally, memory 932 at transmitter system 910 and memory 972 at receiver system 950 can provide storage for program codes and data used by processors 930 and 970, respectively. Further, at receiver system 950, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 10:
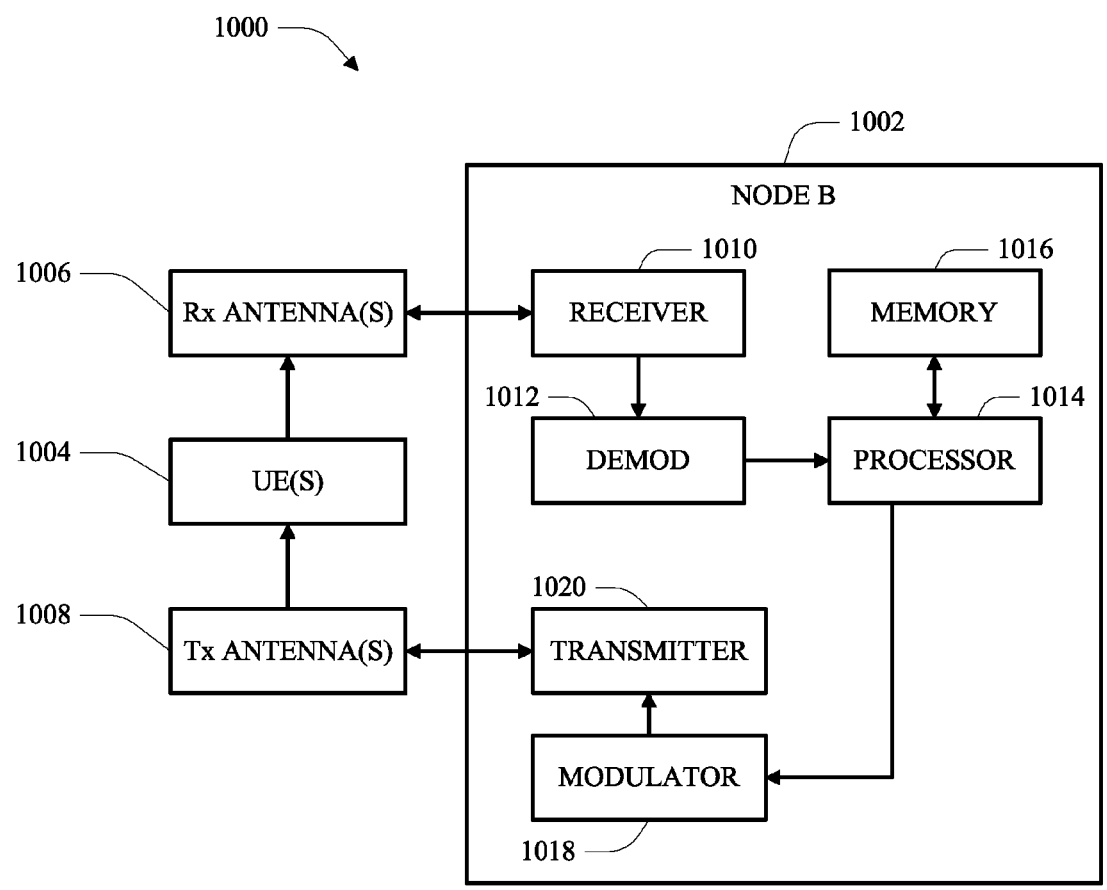
FIGS. 10-11 are block diagrams illustrating example wireless devices that are operable to implement various aspects described herein.

FIG. 10 is a block diagram of a system 1000 that facilitates transmission management in a wireless communication system in accordance with various aspects described herein. In one example, system 1000 includes a base station or Node B 1002. As illustrated, Node B 1002 can receive signal(s) from one or more UEs 1004 via one or more receive (Rx) antennas 1006 and transmit to the one or more UEs 1004 via one or more transmit (Tx) antennas 1008.

Additionally, Node B 1002 can comprise a receiver 1010 that receives information from receive antenna(s) 1006. In one example, the receiver 1010 can be operatively associated with a demodulator (Demod) 1012 that demodulates received information. Demodulated symbols can then be analyzed by a processor 1014. Processor 1014 can be coupled to memory 1016, which can store information related to code clusters, UE assignments, lookup tables related thereto, unique scrambling sequences, and/or other suitable types of information. In one example, Node B 1002 can employ processor 1014 to perform methodologies 700, 800, and/or other similar and appropriate methodologies. Node B 1002 can also include a modulator 1018 that can multiplex a signal for transmission by a transmitter 1020 through transmit antenna(s) 1008.

Figure 11:
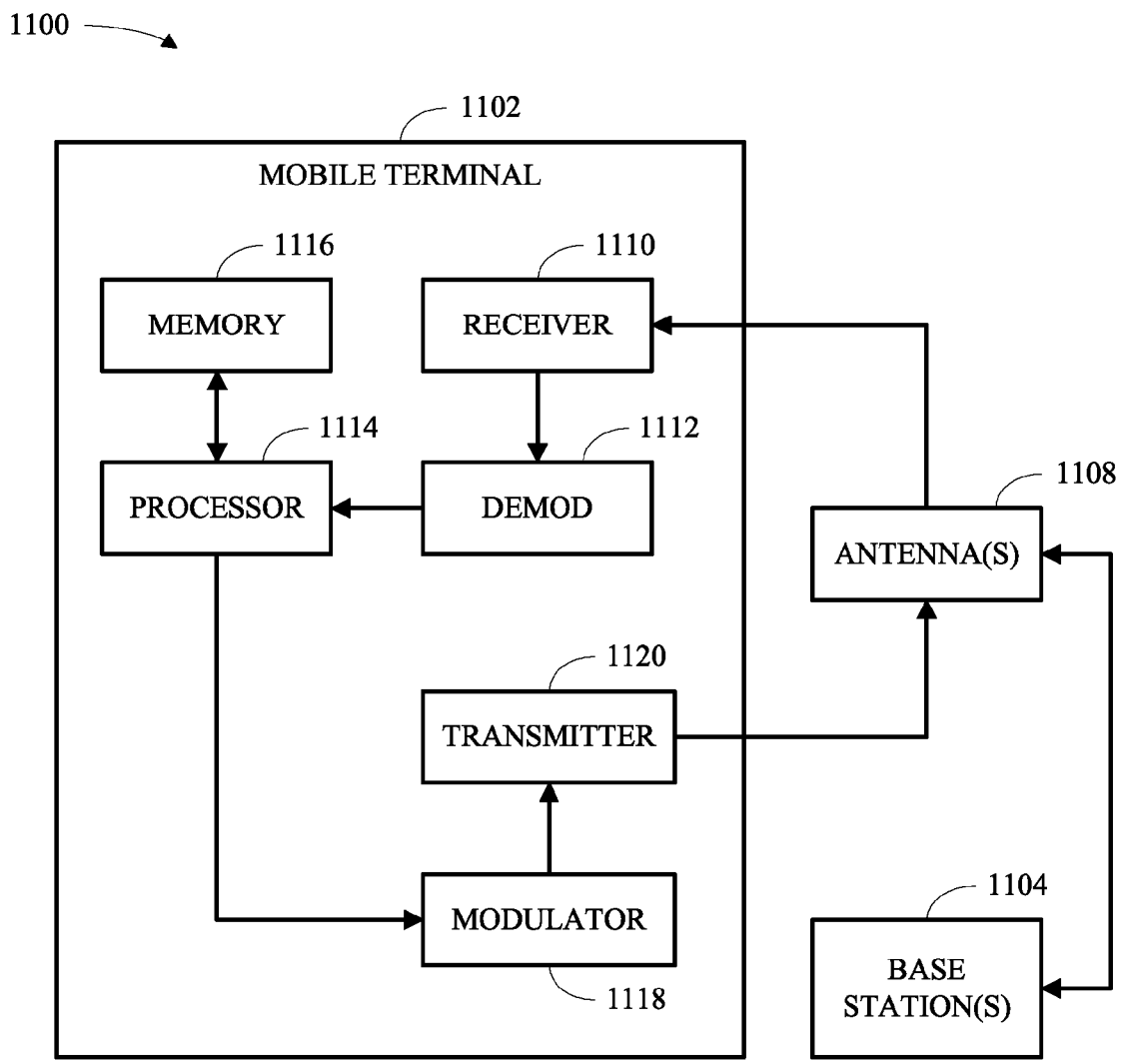

FIG. 11 is a block diagram of an additional system 1100 that facilitates transmission management in a wireless communication system in accordance with various aspects described herein. In one example, system 1100 includes a mobile terminal 1102. As illustrated, mobile terminal 1102 can receive signal(s) from one or more base stations 1104 and transmit to the one or more base stations 1104 via one or more antennas 1108. Additionally, mobile terminal 1102 can comprise a receiver 1110 that receives information from antenna(s) 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to mobile terminal 1102. Additionally, mobile terminal 1102 can employ processor 1114 to perform methodologies 700, 800, and/or other similar and appropriate methodologies. Mobile terminal 1102 can also include a modulator 1118 that can multiplex a signal for transmission by a transmitter 1120 through antenna(s) 1108.

Figure 12:
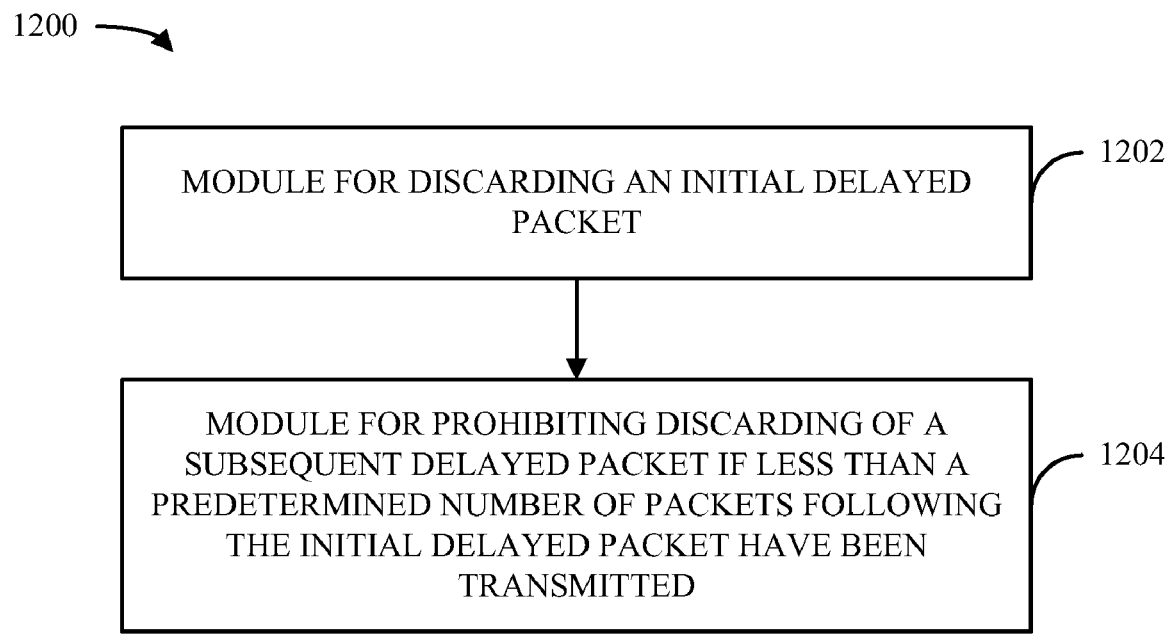
FIG. 12 is a block diagram of an apparatus that facilitates packet discard restriction in a wireless communication system.

FIG. 12 illustrates an apparatus 1200 that facilitates packet discard restriction in a wireless communication system. It is to be appreciated that apparatus 1200 is represented as including functional blocks, which can be functional blocks that represent functions implemented by a processor, software, or combination thereof (e.g., firmware). Apparatus 1200 can be implemented in a Node B, a UE, and/or any other appropriate network entity and can include a module 1202 for discarding an initial delayed packet and a module 1204 for prohibiting discarding of a subsequent delayed packet if less than a predetermined number of packets following the initial delayed packet have been transmitted.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for controlling packet discarding in a wireless communication system, comprising:
    setting a discard packet number based on a mode of operation;
    identifying a packet to be transmitted for which a delay bound has been exceeded as a discard packet;
    determining whether at least a preconfigured number of packets have been transmitted between discarding a previous packet and identifying the discard packet;
    prohibiting discarding of the discard packet upon determining that less than the preconfigured number of packets has been transmitted between discarding the previous packet and identifying the discard packet; and
    discarding more than one discard packet and up to the discard packet number when the preconfigured number of packets have been transmitted between discarding the previous packet and identifying the discard packet.

2. The method of claim 1, further comprising:
    initializing one or more counters to respective preconfigured values;
    updating the one or more counters upon determining that a packet has been transmitted; and
    resetting the one or more counters to their respective preconfigured values upon determining that a number of packets have been discarded that is equal to the discard packet number;
    wherein the determining comprises determining whether at least a preconfigured number of packets have been transmitted between discarding a previous packet and identifying the discard packet based at least in part on the one or more counters.

3. The method of claim 2, wherein:
    the initializing comprises initializing a counter to the preconfigured number of packets;
    the updating comprises decrementing the counter upon determining that a packet has been transmitted;
    the resetting comprises resetting the counter to the preconfigured number of packets upon determining a number of packets have been discarded that is equal to the discard packet number; and
    the determining comprises comparing the counter to a zero value.

4. The method of claim 2, wherein:
    the initializing comprises initializing a counter to a zero value;
    the updating, comprises incrementing the counter upon determining that a packet has been transmitted;
    the resetting comprises resetting the counter to the zero value upon determining that a number of packets have been discarded that is equal to the discard packet number; and
    the determining comprises comparing the counter to the preconfigured number of packets.

5. The method of claim 2, wherein the initializing comprises:
    identifying respective packet flows on which respective packets are to be transmitted; and
    initializing respective counters for the respective identified packet flows.

6. The method of claim 2, wherein:
    the initializing comprises initializing a first counter based on the preconfigured number of packets and initializing a second counter based on a number of tolerated packet discards;
    the updating comprises updating the first counter upon determining that a packet has been transmitted and updating the second counter upon determining that a packet has been discarded;
    the determining further comprises determining whether at least a preconfigured number of packets have been transmitted between discarding a previous packet and identifying the packet to be transmitted based on the first counter and determining whether the tolerated number of packet discards has been conducted based on the second counter; and
    the resetting comprises resetting the first and second counters upon determining that the tolerated number of packet discards has been conducted.

7. The method of claim 1, further comprising determining the preconfigured number of packets based on traffic requirements for one or more packet flows on which packets are to be transmitted.

8. The method of claim 7, wherein the traffic requirements for one or more packet flows on which packets are to be transmitted are based at least in part on an application utilizing the packet flow.

9. The method of claim 7, further comprising adjusting the preconfigured number of packets over time based on changes to the traffic requirements for one or more packet flows on which packets are to be transmitted.

10. The method of claim 1, further comprising receiving the preconfigured number of packets from a base station.

11. The method of claim 1, wherein the packets are Packed Data Convergence Protocol (PDCP) Service Data Units (SDUs).

12. The method of claim 1, further comprising transmitting a packet for which discarding has been prohibited.

13. A wireless communications apparatus, comprising:
a memory that stores data relating to a discard packet, a preconfigured number of packet transmissions, and a discard packet number; and
a processor configured to set the discard packet number based on a mode of operation, determine whether the preconfigured number of packet transmissions has occurred subsequent to discarding of a previous discard packet, prohibit discarding of the discard packet upon determining that the preconfigured number of packet transmissions has not occurred, and discard more than one discard packet and up to the discard packet number when the preconfigured number of packets has been transmitted since discarding the previous packet.

14. The wireless communications apparatus of claim 13, wherein the memory further stores data relating to a packet transmission count and an initialization value, and the processor is further configured to initialize the packet transmission count to the initialization value, to update the packet transmission count upon determining that a packet has been transmitted, to reset the packet transmission count upon determining that a number of packets have been discarded that is equal to the discard packet number, and to determine whether the preconfigured number of packet transmissions has occurred subsequent to discarding of a previous packet based on the packet transmission count.

15. The wireless communications apparatus of claim 14, wherein the processor is further configured to initialize the packet transmission count to the preconfigured number of packet transmissions, to decrement the packet transmission count upon determining that a packet has been transmitted, to reset the packet transmission count to the preconfigured number of packet transmissions upon determining that a number of packets have been discarded that is equal to the discard packet number, and to determine whether the preconfigured number of packet transmissions has occurred subsequent to discarding of a previous packet by comparing the packet transmission count to a zero value.

16. The wireless communications apparatus of claim 14, wherein the processor is further configured to initialize the packet transmission count to a zero value, to increment the packet transmission count upon determining that a packet has been transmitted, to reset the packet transmission count to the zero value upon determining that a number of packets have been discarded that is equal to the discard packet number, and to determine whether the preconfigured number of packet transmissions has occurred subsequent to discarding of a previous packet by comparing the packet transmission count to the preconfigured number of packet transmissions.

17. The wireless communications apparatus of claim 14, wherein the memory further stores data relating to a plurality of packet flows and a plurality of packet transmission counts respectively corresponding to the plurality of packet flows, and the processor is further configured to identify a packet flow corresponding to the packet to be transmitted and to manage discarding of the discard packet based on a packet transmission count corresponding to the identified packet flow.

18. The wireless communications apparatus of claim 13, wherein the processor is further configured to identify a packet flow on which a to-be-transmitted packet is to be transmitted and to determine the preconfigured number of packet transmission based on one or more characteristics of the identified packet flow.

19. The wireless communications apparatus of claim 18, wherein the processor is further configured to adjust the preconfigured number of packet transmissions in response to changes to the characteristics of the identified packet flow.

20. The wireless communications apparatus of claim 13, wherein the processor is further configured to receive the preconfigured number of packet transmissions from a source external to the wireless communications apparatus.

21. The wireless communications apparatus of claim 13, wherein the packets are Packed Data Convergence Protocol (PDCP) Service Data Units (SDUs).

22. The wireless communications apparatus of claim 13, wherein the processor is further configured to transmit the discard packet subsequent to prohibiting discarding thereof.

23. An apparatus that facilitates packet discard restriction in a wireless communication system, the apparatus comprising:
means for setting a discard packet number based on a mode of operation;
means for identifying a packet to be transmitted for which a delay bound has been exceeded as a discard packet;
means for discarding an initial discard packet;
means for prohibiting discarding of a subsequent discard packet if less than a predetermined number of packets following the initial discard packet have been transmitted; and
means for discarding more than one discard packet and up to the discard packet number when the preconfigured number of packets have been transmitted since discarding the initial discard packet.

24. A computer program product, comprising:
a non-transitory computer-readable medium, comprising:
code for initializing a transmission counter;
code of setting a discard packet number based on a mode of operation;
code for updating the transmission counter upon completing a transmission;
code for resetting the transmission counter upon discarding a number of packets equal to the discard packet number;
code for identifying a packet to be transmitted for which a delay bound has been exceeded as a discard packet;
code for prohibiting discarding of data designated for transmission if the transmission counter does not indicate that at least a predetermined number of transmissions have occurred since a previous discard of a packet; and
code for discarding more than one packet and up to the discard packet number when the preconfigured number of packets have been transmitted since the previous discard.

25. An integrated circuit that executes computer-executable instructions for managing a transmission buffer, the instructions comprising:
- buffering a data packet for transmission;
- setting a discard packet number based on a mode of operation;
- determining a delay associated with the data packet;
- comparing the determined delay with a delay requirement for the packet;
- identifying the data packet as a discard packet if the delay has exceeded the delay requirement;
- transmitting the discard packet upon determining that less than a predetermined number of packets have been transmitted subsequent to a previous discard;
- discarding more than one discard packet and up to the discard packet number upon determining that at least the predetermined number of packets has been transmitted subsequent to a previous discard.

26. The method of claim 1, wherein the mode of operation corresponds to one of a first mode including discarding of only consecutive discard packets up to the discard packet number and a second mode including discarding of multiple non-consecutive discard packets up to the discard packet number.

27. The wireless communications apparatus of claim 13, wherein the mode of operation corresponds to one of a first mode including discarding of only consecutive discard packets up to the discard packet number and a second mode including discarding of multiple non-consecutive discard packets up to the discard packet number.

* * * * *